No. 701,370. Patented June 3, 1902.
H. MOSEBACH, Jr.
ICE CREAM FREEZER.
(Application filed Aug. 29, 1899.)
(No Model.) 3 Sheets—Sheet 1.
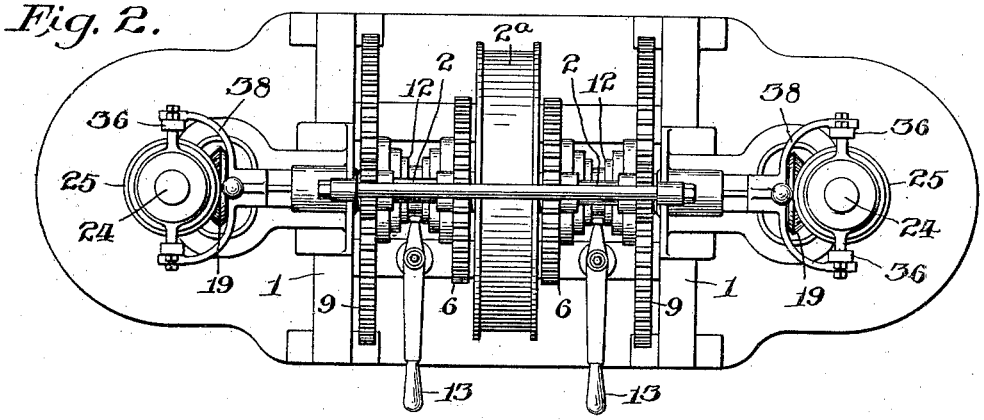
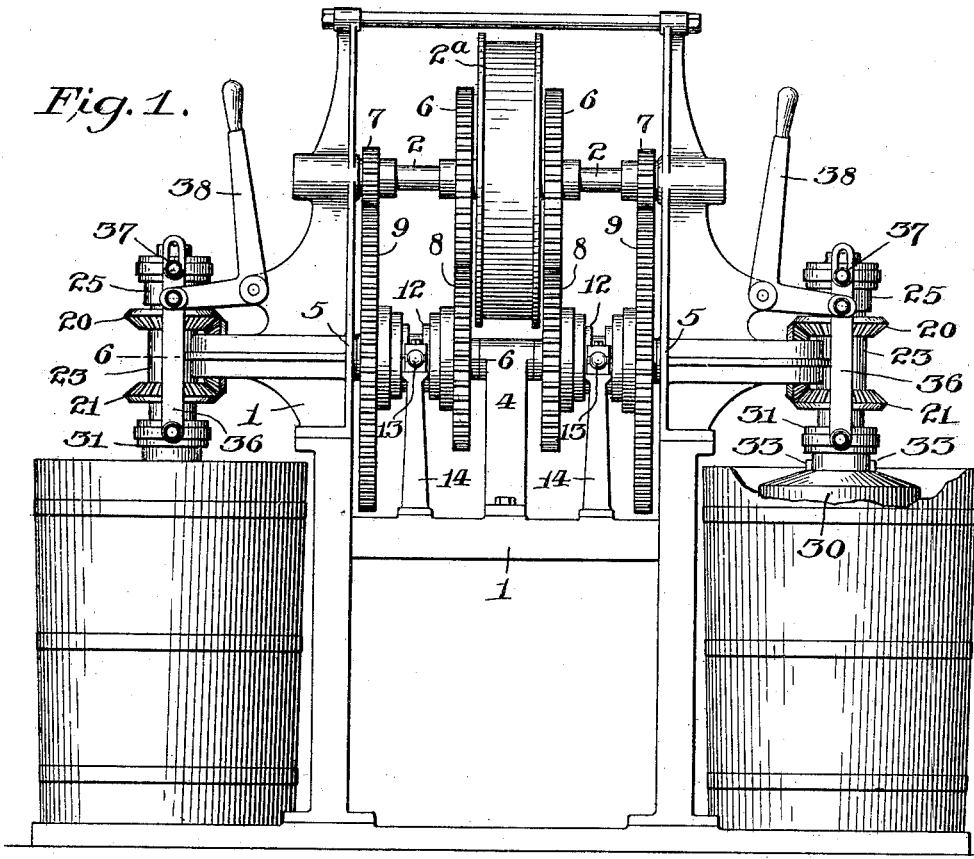
Witnesses. Inventor.
Henry Mosebach Jr.
per John K. Nolan
Attorney.

No. 701,370. Patented June 3, 1902.
H. MOSEBACH, Jr.
ICE CREAM FREEZER.
(Application filed Aug. 29, 1899.)
(No Model.) 3 Sheets—Sheet 2.
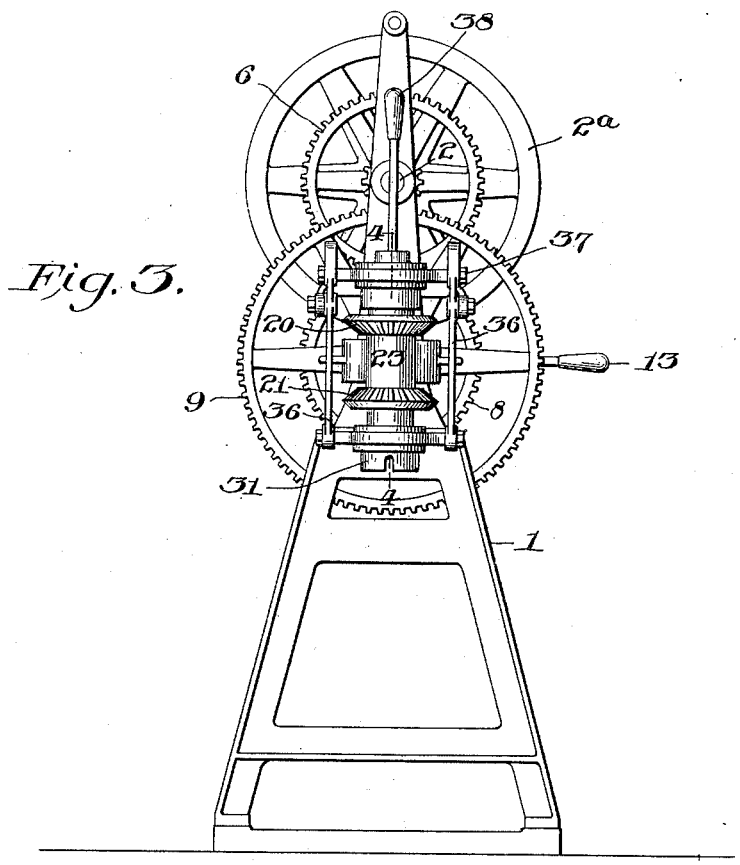
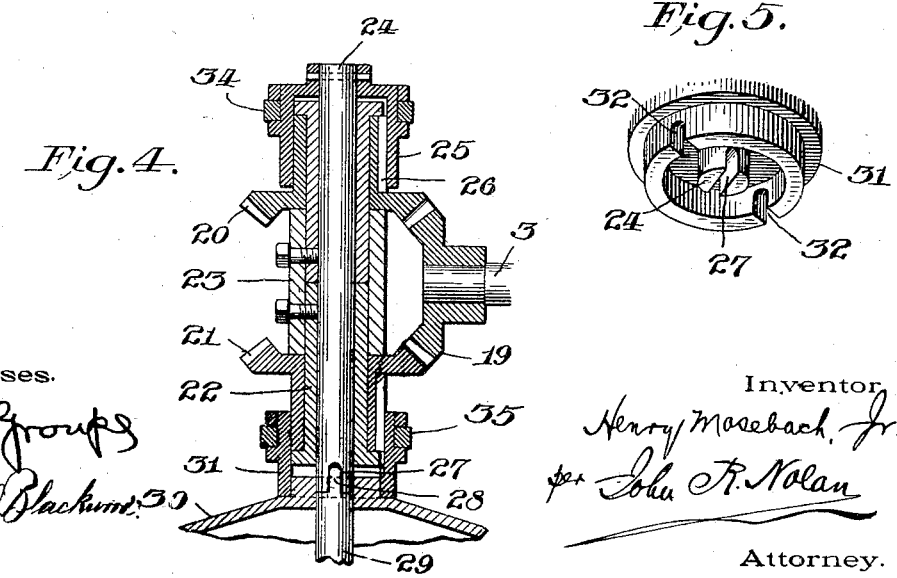
Witnesses. Inventor
A. V. Groups Henry Mosebach, Jr.
Helen D. Blackwood per John R. Nolan
Attorney.

No. 701,370. Patented June 3, 1902.
H. MOSEBACH, Jr.
ICE CREAM FREEZER.
(Application filed Aug. 29, 1899.)
(No Model.) 3 Sheets—Sheet 3.
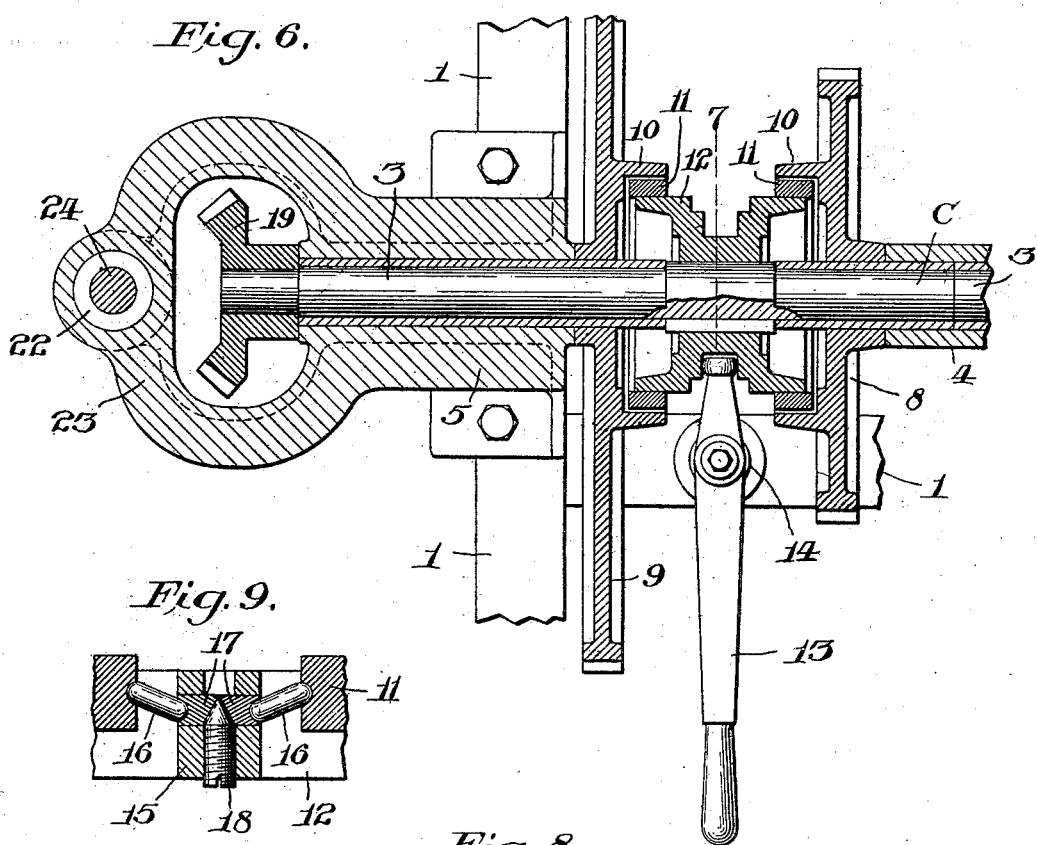
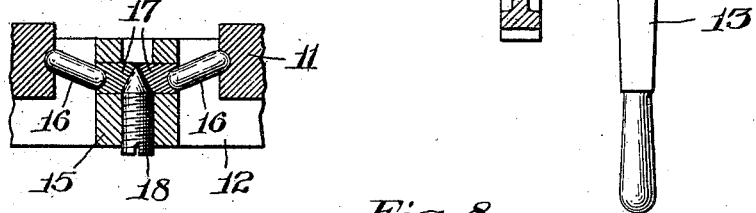
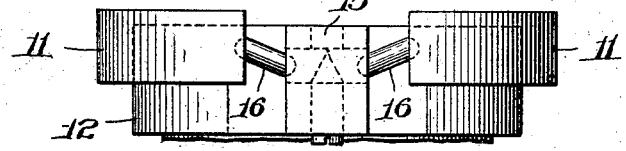
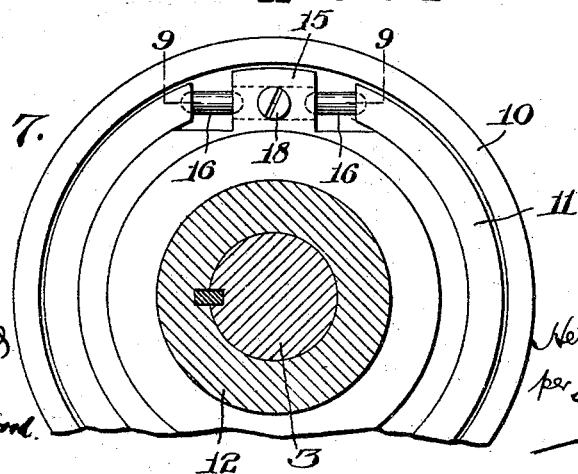
Witnesses. Inventor.
Henry Mosebach, Jr.,
per John R. Nolan
Attorney.

UNITED STATES PATENT OFFICE.

HENRY MOSEBACH, JR., OF PHILADELPHIA, PENNSYLVANIA.

ICE-CREAM FREEZER.

SPECIFICATION forming part of Letters Patent No. 701,370, dated June 3, 1902.

Application filed August 29, 1899. Serial No. 728,827. (No model.)

*To all whom it may concern:*

Be it known that I, HENRY MOSEBACH, Jr., a citizen of the United States, residing in the city and county of Philadelphia and State of Pennsylvania, have invented certain new and useful Improvements in Ice-Cream Freezers, of which the following is a full, clear, and exact description, reference being had to the accompanying drawings, forming a part of this specification.

This invention relates to power-driven ice-cream freezers, its object being to provide a simple and efficient construction and organization of mechanism whereby, among other advantages, a series of vessels may be operated simultaneously or independently from a common driving-shaft at the same or variable rates of speed to meet the requirements of service, as will be hereinafter particularly described and claimed.

In the drawings, Figure 1 is a side elevation of an apparatus embodying my invention. Fig. 2 is a plan thereof. Fig. 3 is an end view of the same. Fig. 4 is a vertical section, enlarged, on the line 4 4 of Fig. 3, including a portion of the cream-can and its paddle-shaft. Fig. 5 is a perspective view of the lower end of the gear-controlled shaft and sleeve for engagement with the paddle-shaft and cream-can, respectively. Fig. 6 is a partial horizontal section, as on the line 6 6 of Fig. 1. Fig. 7 is a vertical section, as on the line 7 of Fig. 6. Fig. 8 is a plan of a portion of Fig. 7. Fig. 9 is a section, as on the line 9 9 of Fig. 7.

1 is a substantial supporting-frame of appriate shape and size for its intended purpose, and 2 is the main driving-shaft, journaled in bearings in the sides of the frame and provided with a pulley $2^a$, which is adapted to be driven from a suitable source of power. Below this shaft is a two-part shaft C, the sections 3 3 of which have their bearings in central and lateral brackets 4 5, respectively, on the main frame, whereby the said sections may be driven independently of each other. Keyed on the main shaft on each side of the driving-pulley are two gear-wheels—viz., a spur-wheel 6 and a pinion 7. These wheels mesh with appropriate wheels 8 9 on the underlying shaft 3, which latter wheels, through the instrumentality of appropriate clutch mechanism, may be fixed to or released from their shaft in alternate succession to insure the driving thereof at the different rates of speed dictated by the coacting gearing, or instead both wheels 8 9 may be simultaneously released in order that their shaft will be unaffected thereby. The gears on the respective shaft-sections 3 3 are provided with corresponding clutch mechanisms, to the end that both sections may be rendered idle and active independently of each other or be driven at the same or variable rates of speed to meet the particular requirements of service. Inasmuch as the clutch mechanisms are identical in construction and operation a description of one will suffice.

The inner faces of the two gear-wheels 8 9 on the shaft-section are provided with concentric flanges 10, in which are contained split elastic rings 11, encircling and normally hugging the respective ends of a sleeve 12 on the shaft. This sleeve is splined on the shaft, so as to be longitudinally movable thereon yet rotatable therewith, and it is provided with a circumferential groove, to which is fitted the shorter arm of a lever 13, that is fulcrumed on a post 14 on the main frame, whereby by actuation of the lever the sleeve may be forcibly moved toward either of the gears or be shifted to an intermediate position. Each end of the sleeve is provided with a peripheral projection 15, that extends between the ends of the adjacent ring 11, and such ends are connected with said projection by arms 16, which are fitted at their extremities to sockets in the opposing parts, whereby when the sleeve is moved toward one of the gears the ring will abut against the opposing gear-face, and the continued movement of the sleeve will cause the arms to spread the ring forcibly against the encircling flange, thus locking the gear to the shaft-section. The arms constitute, in effect, a toggle-joint, and they are so disposed that when the ring is clamped against the gear, as just stated, they will have passed the "center," and thus be locked in the clamping position. In order that the sockets in the projection may be adjusted in respect to the corresponding sockets in the ends of the ring, so as to regulate to a nicety the throw of the toggle, and to compensate for wear, I form the first-named sockets in blocks 17, which are fitted to recesses in the projection and provide the latter with a set-screw 18, the point of which is beveled and adapted to bear against the inner ends of the blocks, whereby when the screw is moved inward the blocks are correspondingly adjusted outward, and when the screw is reversely moved the blocks being freed will be adjusted toward each other by the thrust of the toggle-arms. When the sleeve is in the intermediate position, the split rings 11 hug the sleeve and are out of contact with the encircling flanges, both gears thus being loose on the shaft-section. When the sleeve is moved to the right, the right-hand ring is forced into contact with the opposing gear, so as to clamp the latter on the shaft, the left-hand gear remaining idle, and when the sleeve is moved to the left the condition of the gears is reversed.

On the outer ends of the respective shaft-sections are bevel-gears 19 19, each of which coacts with two oppositely-disposed bevel-wheels 20 21, respectively, mounted on a vertically-disposed flanged bushing 22, affixed to an extension 23 of the main frame. Extending through this bushing is a shaft 24, the upper end of which is secured to a cap 25, that embraces the head of the bushing and the hub of the wheel 20. The cap is connected with this hub by a spline 26, so as to be vertically movable on the hub, yet rotatable thereby. The lower end of the shaft 24 is provided with a socket 27, which is adapted to register with a tongue or projection 28 on the upper end of the paddle-shaft 29 in the cream-can 30, and thereby effect the rotation of the latter shaft at a rate of speed determined by that of the shaft-section 3 and the intermediate gearing. Splined to and rotatable by the hub of the lower wheel 21 is a sleeve 31, the lower edge of which is provided with sockets 32, adapted to register with spuds 33 on the top of the cream-can, and thereby rotate the said can in a direction opposite to that of the internal paddle-shaft. The cap and sleeve are provided with circumferential rings 34 35, respectively, which are coupled by links 36, the union with the upper ring being a pin-and-slot connection 37, whereby independent vertical movement of the cap and its shaft 24 may be had. The links are pivotally connected with the yoke-shaped arm of a bell-crank lever 38, suitably fulcrumed on the main frame, to the end that when the upper or handle arm of said lever is properly swung the sleeve and collar will be simultaneously raised to free the can and the paddle-shaft from their actuating mechanism, in which case the tub and its contents may be removed from the structure.

When the tub, with its contents, is disposed below the operating devices, the can is turned sufficiently to permit the socketed collar to engage with the studs on the can, whereupon the machine is set in operation, the socketed lower end of the shaft, by reason of the pin-and-slot connection with the links, automatically dropping into register with the tongue on the upper end of the paddle-shaft immediately upon the sockets being in line with the tongue. In the absence of this independent vertical movement of the shaft 24 it would be necessary to set both the can and the paddle-shaft in perfect alinement with the socketed sleeve and shaft, respectively, before the operative engagement of the parts could be effected.

I claim—

1. In an apparatus of the character described, the combination with a driving-shaft and two sets of gears thereon whereof each set comprises two wheels of different diameters, of two counter-shafts having loosely mounted thereon sets of gears coacting with the respective sets on the driving-shaft, a clutch mechanism on each of said counter-shafts intermediate the loose gears and adapted to render the adjacent gears active or inactive as desired, and mechanism whereby the said counter-shafts may be operatively connected with the paddle-shafts and cans of freezing vessels, substantially as described.

2. The combination with the can and paddle-shaft of a freezing vessel, of a frame adjacent thereto, a vertically-disposed bushing on said frame, two oppositely-disposed beveled wheels on the upper and lower end of said bushing, a driving-shaft provided with a gear engaging said wheels, a cap having a sliding connection with the upper wheel, a sleeve having a similar connection with the lower wheel, a central shaft in said bushing affixed at its upper end to said cap, a sliding connection between said cap and sleeve, and means for operating said connection, together with interlocking portions for the abutting ends of the paddle-shaft and the said central shaft, and interlocking portions for the sleeve and the can, substantially as described.

In testimony whereof I have hereunto affixed my signature this 1st day of August, A. D. 1899.

HENRY MOSEBACH, JR.

Witnesses:
ANDREW V. GROUPE,
JOHN R. NOLAN.